(12) United States Patent
Langhammer

(10) Patent No.: US 9,956,679 B2
(45) Date of Patent: May 1, 2018

(54) DEVICE AND METHOD FOR REMOVABLE UTENSIL THAT ATTACHES TO HANDLE OF VARIABLE SIZES

(71) Applicant: Kevin Dale Langhammer, Carmel, IN (US)

(72) Inventor: Kevin Dale Langhammer, Carmel, IN (US)

( * ) Notice: Subject to any disclaimer, the term of this patent is extended or adjusted under 35 U.S.C. 154(b) by 238 days.

(21) Appl. No.: 14/995,867

(22) Filed: Jan. 14, 2016

(65) Prior Publication Data
US 2017/0203429 A1   Jul. 20, 2017

(51) Int. Cl.
| | |
|---|---|
| *A47J 37/08* | (2006.01) |
| *B25G 1/10* | (2006.01) |
| *A47G 21/02* | (2006.01) |
| *A01K 97/14* | (2006.01) |
| *A01M 99/00* | (2006.01) |
| *A47J 37/04* | (2006.01) |
| *F24B 15/00* | (2006.01) |

(52) U.S. Cl.
CPC .............. *B25G 1/102* (2013.01); *A01K 97/14* (2013.01); *A01M 99/00* (2013.01); *A47G 21/023* (2013.01); *A47J 37/049* (2013.01); *F24B 15/002* (2013.01)

(58) Field of Classification Search
USPC .................................................... 99/421, 340
See application file for complete search history.

(56) References Cited

U.S. PATENT DOCUMENTS

| | | | | |
|---|---|---|---|---|
| 2,189,047 A | * | 2/1940 | Tolen .................. | A47J 37/0694 211/60.1 |
| 2,514,281 A | * | 7/1950 | Hobbs ................ | A47J 37/0694 211/70.1 |
| 2,706,446 A | * | 4/1955 | Lockey ............... | A47J 37/0694 99/419 |
| 3,927,609 A | * | 12/1975 | Scott ....................... | A47J 43/18 99/419 |
| D244,903 S | * | 7/1977 | Hildebrand ................. | 99/421 A |
| 5,238,445 A | * | 8/1993 | Green ................. | A47J 37/0694 452/198 |
| D344,216 S | * | 2/1994 | Shepherd ........................ | D7/683 |
| 5,628,244 A | * | 5/1997 | Holliday ................. | A47J 43/18 99/419 |
| 5,775,207 A | * | 7/1998 | Warren ................. | A47J 43/283 99/394 |
| 6,196,121 B1 | * | 3/2001 | Crowl ..................... | A47J 43/18 99/394 |
| 6,464,271 B1 | * | 10/2002 | Irvin, Jr. ............... | A47J 43/283 294/26 |
| 6,701,827 B1 | * | 3/2004 | Longbrake ............ | A47J 37/049 294/209 |
| D503,315 S | * | 3/2005 | Lanier ........................... | D7/684 |

(Continued)

*Primary Examiner* — Nina Bhat

(57) ABSTRACT

An open fire cooking utensil attachment configured to be attached to a handle for easy attaching and removal. The utensil is made of wire or similar material to a handle that can vary in diameter and length. The open fire cooking utensil device affords a utensil that generally requires a long handle, the ability to be easily attached and removed from the handle so that it is easy to store, carry, and clean. The open fire cooking utensil attaches to a handle of various diameters and lengths to fit the specific needs of the user and the handle materials available.

2 Claims, 2 Drawing Sheets

(56) References Cited

U.S. PATENT DOCUMENTS

| | | | | |
|---|---|---|---|---|
| D506,109 S | * | 6/2005 | Deal | D7/683 |
| 6,959,496 B2 | * | 11/2005 | Wilkinson, Jr. | A47J 43/283 |
| | | | | 30/322 |
| D519,331 S | * | 4/2006 | Camp | D7/683 |
| 7,735,416 B2 | * | 6/2010 | Ekberg | A47J 37/0763 |
| | | | | 126/30 |
| 8,590,446 B1 | * | 11/2013 | Bussis | A22C 11/00 |
| | | | | 99/419 |
| D756,704 S | * | 5/2016 | Johansson | D7/409 |
| 2004/0061345 A1 | * | 4/2004 | Harmon | A47J 43/18 |
| | | | | 294/61 |
| 2012/0152962 A1 | * | 6/2012 | Arbuckle | B25G 3/26 |
| | | | | 220/573.2 |
| 2015/0223636 A1 | * | 8/2015 | Brouwer | A63B 47/02 |
| | | | | 99/340 |

* cited by examiner

 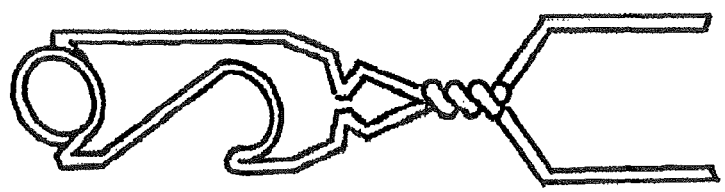 
FIG. 3A　　　　　　　　FIG. 3B　　　　　　　　FIG. 3C
FIG. 3D
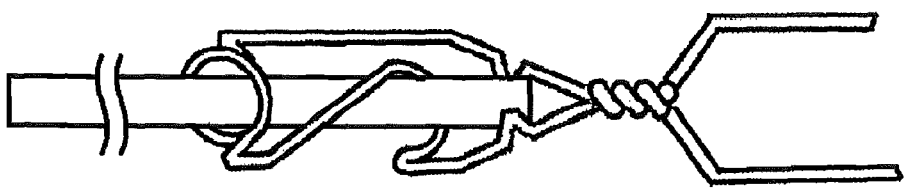
FIG. 4

DEVICE AND METHOD FOR REMOVABLE UTENSIL THAT ATTACHES TO HANDLE OF VARIABLE SIZES

BACKGROUND OF THE INVENTION

1. Field of the Invention

The present invention relates to a device and method for easily attaching and removing a utensil made of wire or similar material to a handle that can vary in diameter and length. For example a tree branch, stick, or wooden dowel. The invention is generally related to open fire cooking utensils, and fishing/hunting spearheads, although other uses within the ability of those skilled in the art and without departing from the true spirit and scope of the novel concepts or principles of this invention are also included within the field of the invention. More particularly, the present invention concerns a method for easily attaching and removing a utensil made from wire or similar material to a handle of varying diameter and length in accordance with the claims.

2. Description of Related Art

When cooking over an open fire, the utensil to hold the food requires a long handle to keep the user far enough from the heat to prevent being burned. However it is cumbersome to pack, store, and travel with a utensil that can be over 2 feet long. It is also hard to clean such a long device after use. Similarly a frog gig, fishing or hunting spear requires a long handle and is hard to store, transport, or clean. It is advantageous for any utensil that generally requires a long handle, to have the ability to be attached and removed so that it is easy to store, carry, and clean. It is also advantageous if the utensil can attach to a handle of varying diameter and/or length to fit the specific needs of the user and materials available. In order to be effective the utensil must attach firmly to handle with minimal slipping or twisting when weight is applied. Many attempts have been made to provide utensils that telescope or other wise try to solve the issues of storing and transporting utensils that require a long handle, but few have attempted to develop a utensil that can be easily attached and removed from the handle.

Prior known attempts to create a method to easily attach and remove a utensil made of wire or similar material to a handle of varying diameters and lengths have failed to provide an adequate amount of gripping power to prevent slipping and twisting when weight is applied. They also are made in 3 dimensional shapes that are thick and easily tangled when storing more than one together. Reference prior marketed products: Grandpa's fire fork from Light my fire, and Grill Thing From Clever Camper The innovative and novel features of this device provide a flat, very compact method for attaching a utensil that applies enough tension/torsion pressure in at least three spots on the handle to minimize slipping or twisting when weight is applied. The flat design makes it easy to pack, store, and carry.

SUMMARY OF THE INVENTION

In keeping with the requirements of Patent Laws there is described herein below the best mode of the invention that is currently known to the applicant. For the purposes of promoting an understanding of the principles of the invention, reference will now be made to the embodiment, illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Disclosed is a simple, compact, device and method to attach a utensil made of wire or similar material to a handle. It is an object of the present invention to provide a solution for easily attaching and removing a utensil onto a handle that can vary in diameter and length.

One particular object is to provide a method to easily attach and remove a cooking utensil such as a roasting fork, to a handle such as a tree branch or stick.

Another object is to provide a method to easily attach and remove a fishing utensil such as a frog gig or fish spearhead, to a handle such as bamboo pole.

It is important that that invention be attached firmly to minimize slipping or twisting, and that it is compact and easy to carry, store, and clean.

A basic embodiment of the invention discloses a device of novel shape made of bent wire or similar material that will provide at least three contact points on the handle with enough tension pressure to securely hold the utensil in place with minimal slipping or twisting.

According to the most preferred embodiment disclosed here, the utensil is formed of a resilient material, such as stainless steel wire, which allows some give and bend, but springs back into its original shape to provide sufficient tension and torsion pressure on the handle.

The bottom section of the utensil that attaches to the handle is a novel two dimensional bend design that is flat and very compact which allows for easy storage and transport. The top section of the utensil also called the stem or head, can be made into the shape of a roasting fork, barbeque spit, skewer, fire poker, or other similar cooking utensil. It can also be made into the shape of a frog gig, fishing spearhead, gaff, or other similar fishing/hunting utensil.

A handle of varying diameter and length is inserted into the geometric shape at the bottom of the devise and devise is pressed toward the handle until the middle section of the devise loops over the handle and hook shape holds utensil securely to handle.

These and other features and advantages will be apparent from a reading of the following detailed description and a review of the associated drawings. It is to be understood that both the foregoing general description and the following detailed description are explanatory only and are not restrictive of aspects of the invention as claimed.

BRIEF DESCRIPTION OF THE DRAWINGS

The invention will be described in more detail below, with reference to the included schematic drawings that show examples of the currently preferred embodiments of the invention.

FIG. 3A is a side view of one illustrative embodiment of a removable roasting fork utilizing the attachment method in accordance with the present invention FIG. 3B is a top view of one illustrative embodiment of a removable roasting fork in accordance with this invention FIG. 3C is a side view of one illustrative embodiment of a removable roasting fork in accordance with this invention FIG. 3D is a front view of one illustrative embodiment of a removable roasting fork in accordance with this invention FIG. 4 shows one illustrative embodiment of a removable roasting fork with a handle attached utilizing the method in accordance with the present invention.

DETAILED DESCRIPTION OF THE INVENTION

Figure 1:
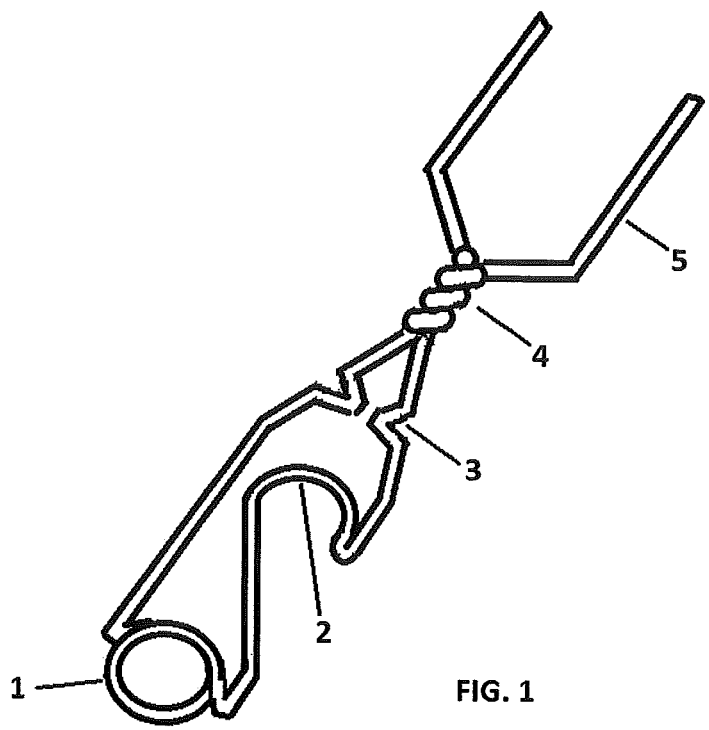
FIG. 1 shows one illustrative embodiment of a removable roasting fork utilizing the attachment method in accordance with the present invention.
Figure 2:
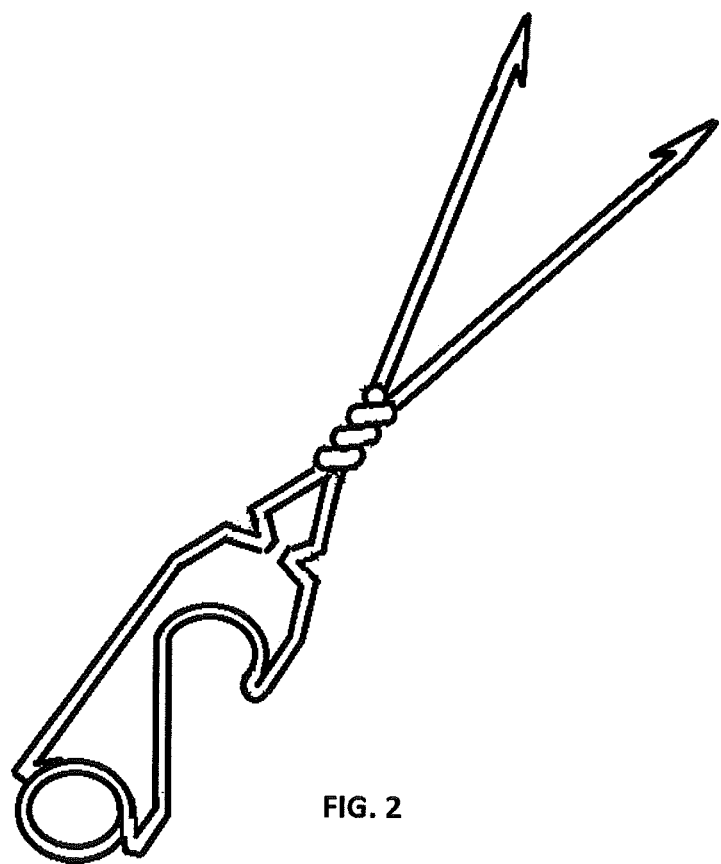
FIG. 2 shows one illustrative embodiment of a removable spearhead for fishing utilizing the attachment method in accordance with the present invention.

Referring now in detail to the drawings, wherein reference numerals designate parts to the embodiment of FIG. 1, there is seen one illustrative embodiment of a removable roasting fork utilizing the attachment method in accordance with the present invention. 1 is the bottom of the attachment device and is depicted in a spherical shape although other geometric shapes could be used. 1 forms the first two pressure points on the handle. 2 depicts the middle hooking section which is shown with a rounded shape but could also be made to be more angular. 2 forms the third pressure point on the handle. 3 depicts the optional forth pressure points that can be used to hold the handle more securely. 4 depicts the twisting of the wire to form a bonding of the wire together and also forms the stem of the utensil. 4 could also be accomplished in other ways such as welding or crimping a band around the wires. 5 depicts the top of the utensil presently shaped to form the tines of an open fire roasting fork. 5 could also be shaped to form other utensils.

Referring to the drawing FIG. 1. To attach a handle to the device; the handle is inserted into the geometric shape at the bottom of the device 1. Handle should be inserted to a depth equal to one half the length of the device or greater. Device is then pressed towards the handle until the geometric shape 2 is on the opposite side of the handle. Device is then slid sideways to hook securely onto the handle forming the third pressure point. If the insertion of the handle is measured appropriately the forth pressure points 3 can be utilized to provide even greater holding strength.

This invention can be made to nearly any size desired. The following description describes how one embodiment can be made utilizing a 20 inch length of stainless steel wire or similar material. At the midpoint of the length of wire it is bent into a geometric shape such as a circle with a diameter of 0.5 inches. The wire is continued to be bent until it overlaps 50% of the geometric shape. Wire is then bent 180 degrees on both sides of the geometric shape. The right side wire is bent inwards at a 45 degree angle at a point equal to the top of the geometric shape. One quarter of an inch before the right wire meets the left wire, it is bent into one half of a geometric shape, such as a circle with a diameter of 0.5 inches. The right wire is then bent 180 degrees to be parallel to the left wire. At a point equal to the top of the second geometric shape both left and right wires are bent inwards at a 45 degree angle. At a point 0.5 inches from last bend on both wire ends a bend should be made at 45 degrees inward. At a point 0.25 inches from last bend both wire ends are bent 90 degrees outward. At a point 0.25 inches from last bend on both wire ends a bend is made at 45 degrees inward. At the point where both wire ends cross they are twisted around each other 4 times. Both wire ends are then bent at an 80 degree angle away from the twist. At a point 1 inch from last bend, both wire ends are bent inward at a 70 degree angle to be parallel with each other. Both wire ends are then cut to a length of 1.5 inch from last bend. The lengths, angles, and instructions described are for descriptive purposes only, and are not to be considered exact or limiting.

This invention having been described in its presently contemplated best mode, it is clear that it is susceptible to numerous, variations, modifications, modes and embodiments within the ability of those skilled in the art and without departing from the true spirit and scope of the novel concepts or principles of this invention. Also, it is to be understood that the phraseology and terminology employed herein are for the purpose of description and should not be regarded as limiting. It should be understood that the preferred embodiment has been shown and described and that all changes and modifications that come within the spirit of the invention are desired to be protected. The invention is capable of other embodiments and of being practiced and carried out in various ways. As such, those skilled in the art will appreciate that the conception, upon which this disclosure is based, may readily be utilized as a basis for the designing of other structures, methods and devices for carrying out the several purposes of the present invention. It is important, therefore, that the claims be regarded as including such equivalent constructions insofar as they do not depart from the spirit and scope of the present invention.

The invention claimed is:

1. An open fire cooking utensil configured to be attached to a handle comprising: a wire cooking utensil attachment including an aperture configured to receive said handle and three handle retention portions adapted to retain said handle in said wire cooking utensil attachment by pressure; wherein a first of said three handle retention portions is spaced a first distance from said aperture and both a second and a third of said three handle retention portions are spaced a second distance from said aperture; wherein the wire cooking utensil attachment further comprises fork times, a spear or a frog gig for piercing food items and cooking said food items over an open flame.

2. A removable spearhead utensil configured to be attached to a handle comprising:
   a wire utensil attachment including an aperture configured to receive said handle and three handle retention portions adapted to retain said head in said wire utensil attachment including an aperture configured to receive said handle and three handle retention portions adapted to retain said handle in said wire utensil attachment by pressure;
   wherein a first of said three handle retention portions is spaced a first distance from said aperture and both a second and a third of said three handle retention portions are spaced a second distance from said aperture; wherein the wire utensil attachment further comprises includes a spear or frog gig for hunting and/or fishing.

\* \* \* \* \*